(12) United States Patent
Hayakawa et al.

(10) Patent No.: US 6,347,269 B1
(45) Date of Patent: Feb. 12, 2002

(54) VEHICLE MASS CALCULATION DEVICE

(75) Inventors: Kisaburo Hayakawa; Masataka Osawa; Hiroyuki Yoshida; Masuji Oshima, all of Aichi-ken (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/625,985

(22) Filed: Jul. 26, 2000

(51) Int. Cl.$^7$ .............................................. G01M 15/00
(52) U.S. Cl. ............................ 701/51; 701/70; 702/175
(58) Field of Search .............................. 701/29, 51, 54, 701/70; 702/175

(56) References Cited

U.S. PATENT DOCUMENTS

| | | | | |
|---|---|---|---|---|
| 5,215,154 A | * | 6/1993 | Kirby | .......................... 177/136 |
| 5,482,359 A | * | 1/1996 | Breen | .......................... 303/969 |
| 6,167,357 A | * | 12/2000 | Zhu et al. | ................... 702/175 |

FOREIGN PATENT DOCUMENTS

| | | |
|---|---|---|
| JP | 6-147304 | 5/1994 |
| JP | 6-201523 | 7/1994 |

* cited by examiner

*Primary Examiner*—Richard M. Camby
(74) *Attorney, Agent, or Firm*—Oblon, Spivak, McClelland, Maier & Neustadt, P.C.

(57) ABSTRACT

To calculate a vehicle mass based on a driving force caused by an engine, running resistance, and vehicle acceleration, influence of gradient resistance is removed. A gross driving force calculating section calculates a gross driving force F of a vehicle by deducting running resistance from a driving force of a vehicle caused by an engine. An acceleration sensor calculates a longitudinal acceleration $\alpha$ of the vehicle. Relationship among a gross driving force F, a longitudinal acceleration $\alpha$, a vehicle mass M, and road gradient $\Theta$ can be expressed as ($\alpha = F/M - g \sin \Theta$). Because the change of gradient contains only a low frequency component, by processing a gross driving force F and an acceleration $\alpha$, using a high-pass filter with a predetermined cut-off frequency, the influence of the gradient $\Theta$ can be removed. Based on the resultant processed gross driving force F and the processed acceleration $\alpha$, a vehicle mass can be obtained from the above expression without being affected by the influence of the gradient

16 Claims, 13 Drawing Sheets

| V: DESIGN SPEED [km/h] | 40 | 80 | 120 |
|---|---|---|---|
| L: REQUIRED VERTICAL SECTIONAL CURVE LENGTH [m/%] | 4.4 | 17.8 | 40.0 |
| GRADIENT VARIATION RATE [%/sec] | 2.5 | 1.2 | 0.8 |
Fig. 1
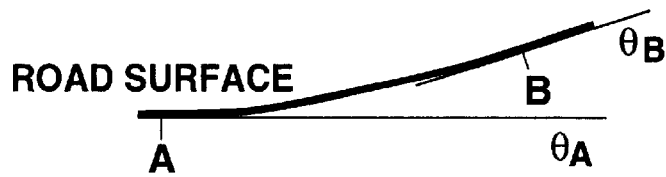
Fig. 2
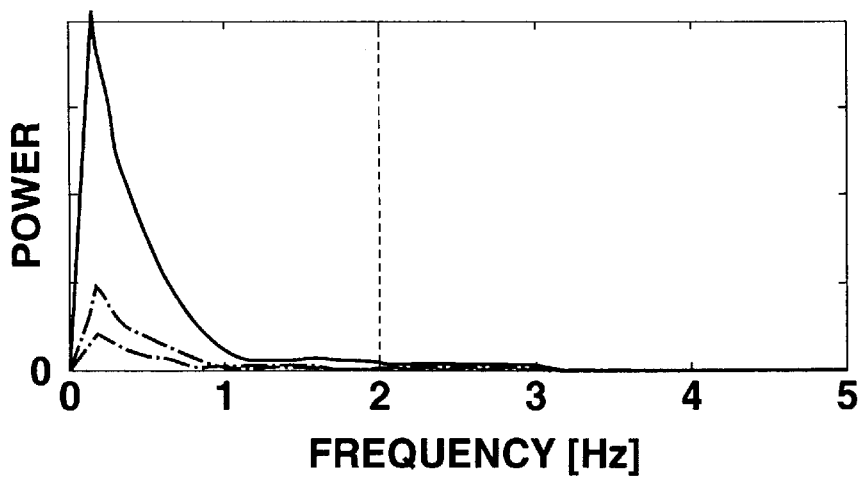
Fig. 3

VEHICLE MASS CALCULATION DEVICE

BACKGROUND OF THE INVENTION

1. Field of the Invention

The present invention relates to a vehicle mass calculation apparatus for calculating a vehicle mass for use in, for example, determining shift timing in an automatic transmission.

2. Description of the Related Art

In recent years, attempts have been made to achieve more efficient, more response of automatic transmissions to better match the driver's feelings. Specifically, shift timing and gear are determined based on various factors including not only vehicle speed and weight on the accelerator pedal, but also vehicle mass and the gradient of the road on which the vehicle is travelling.

Automatic transmissions, before mainly found in private vehicles, are now also employed in commercial vehicles such as taxis and buses. For private vehicles, a vehicle mass generally does not vary significantly because a relatively small number of passengers is carried, and the need of considering a vehicle mass as a variable in transmission control is therefore not great. However, for commercial vehicles, vehicle mass may vary significantly depending on the number of passengers, and it is therefore preferable to treat vehicle mass as a variable, rather than as a fixed value, in transmission control. Recently, even passenger vehicles come to find the need for a vehicle mass to be handled as a variable along with the permeation of the type, such as mini-vans, which can accommodate a relatively large number of passengers. Also, more accurate transmission control is now desired in conventional four-door sedans.

As a vehicle mass measurement method, there is available a method in which suspension displacement is measured with a vehicle in a still state, and another method in which vehicle mass is calculated using a load weight sensor provided to a suspension. Both these methods, however, can only be applied when the vehicle is not moving.

As a method for calculating a vehicle mass while the vehicle is travelling, one known method is based on the relationship between acceleration and driving force. Specifically, while a specific amount of driving force is being generated, vehicle mass is determined to be large when the vehicle only accelerates slightly, and is determined to be small when a large acceleration is generated.

Japanese Patent Laid-open Publication No. Hei 6-147304 discloses a technology for calculating vehicle mass by using a neural network which receives time series signals indicative of vehicle acceleration, vehicle speed, and opening of a throttle valve with the accelerator pedal being depressed. Japanese Patent Laid-open Publication No. Hei 6-201523 discloses vehicle mass calculation which a vehicle acceleration, a vehicle speed, and a throttle position of a vehicle having a less varying throttle position and running on a road of a constant gradient, are detected, and the detected data in two cases of different throttle position are compared to each other. These methods enable detection of a vehicle mass of a running vehicle.

However, the method described in JP Laid-open Publication No. Hei 6-147304 does not take road gradient into consideration. In other words, the road must be level for achievement of accurate vehicle mass calculation. In the method described in JP Laid-open Publication No. Hei 6-201523, gradients in the two cases subjected to comparison must be equal to each other. That is, the methods described in the above mentioned publications have a problem that the road gradient must be known within a certain degree of accuracy in order to achieve accurate vehicle mass calculation.

SUMMARY OF THE INVENTION

The present invention aims to provide an apparatus capable of calculating a mass of a vehicle in motion without being affected by road gradient.

In order to solve the above described problems, according to the present invention, there is provided a vehicle mass calculation apparatus, comprising acceleration calculating device for calculating a longitudinal acceleration of a vehicle to obtain an acceleration signal; driving force calculating device for obtaining a driving force signal corresponding to a driving force of a power plant of the vehicle; first signal processing device for removing influence of resistance acting on the vehicle from the acceleration signal to obtain a processed acceleration signal, second signal processing device for removing influence of resistance acting on the vehicle from the driving force signal to obtain a processed driving force signal and vehicle mass calculating device for calculating a vehicle mass based on the processed acceleration signal and the processed driving force signal.

The relationship between a force acting on a vehicle and vehicle acceleration in the longitudinal direction of a vehicle can be expressed as (force acting on vehicle)=(vehicle mass)×(vehicle acceleration).

When the force acting on the vehicle and the vehicle acceleration are both known, vehicle mass can be calculated. A force acting on a vehicle mainly comprises a driving force caused by a power plant of a vehicle and a resistance force acting on the vehicle. A resistance force includes friction resistance (such as rolling resistance), air resistance, and resistance due to road gradient. Gradient resistance may vary depending on road gradient, whereas friction and air resistance (hereinafter together referred to as running resistance) are determined at a substantially fixed value for each vehicle. That is, forces other than gradient resistance can be obtained in advance once conditions such as a running speed and the state of a power plant are known.

A power plant constitutes a motor and a transmission device, and the motor is generally an internal combustion engine. An power of an internal combustion engine can be obtained in advance so as to correspond to an engine speed and a throttle position. When the transmission device has a slip transmission element, e.g., a torque converter, torque transmission or characteristic of the slip transmission element must be taken into consideration in calculating a driving force of the power plant.

Meanwhile, gradient resistance, which is resistance due to the gradient of a road where a vehicle is running and not the characteristic of the vehicle itself, cannot be obtained in advance. When a vehicle is running on a road with a constant gradient (including a level road), gradient resistance is a constant, and contains only a DC component in time series. Therefore, removal of the DC component will resultantly provide an equation of motion free from the influence of gradient. Even with an inconstant gradient, an equation of motion free from the influence of gradient can be obtained through specification and removal of a frequency band of the gradient resistance, affected by a change of road gradient. Removal of that frequency band can result in additional removal of the influence of a variation of friction resistance (such as rolling resistance) and air resistance as the frequency of that variation is also low.

In consideration of this property, the first and second signal processing device are filters for removing a frequency band affected by the influence of gradient. Moreover, as the influence of constant gradient appears as a DC component and that of a varying gradient is of a low frequency component, as described above, the first and second signal processing device are preferably high-pass filters for removing a low frequency component. The high-pass filter can additionally remove vehicle friction resistance and air resistance.

According to another aspect of the present invention, there is provided a device for calculating a mass of a vehicle loaded with a power plant including a motor and a transmission device, comprising device for calculating a first physical variable relative to an acceleration calculated by the output rotational speed of the transmission device to obtain a first signal; device for calculating a second physical variable relative to an input torque of the transmission device to obtain a second signal; device for storing transmission characteristic of the transmission device; first signal processing device to remove influence of resistance acting on the vehicle from the first signal to obtain a first processed signal; second signal processing device to remove influence of resistance acting on the vehicle from the second signal to obtain a second processed signal; and vehicle mass calculating device for calculating a mass of the vehicle based on the first processed signal and the second processed signal.

A vehicle inertia is imparted to the inertia of a transmission device. Inertia of a transmission device can be obtained based on the relationship between an input and an output of the power transmission device. When inertias of a transmission device other than the driving form transmission device are known, the inertia of the vehicle can be obtained.

BRIEF DESCRIPTION OF THE DRAWINGS

FIG. 1 is a table of specification on a gradient variation, required for impact modification with a road;

FIG. 2 is a graph showing a vertical sectional curve for a part of a road with a varying gradient;

FIG. 3 is a graph showing a result of frequency analysis applied to a function $\Theta(t)$ indicative of variation of a gradient, as time passes, when a vehicle runs at a predetermined speed on a part of a road with a gradient of FIG. 1;

DESCRIPTION OF THE PREFERRED EMBODIMENTS

Figure 4:
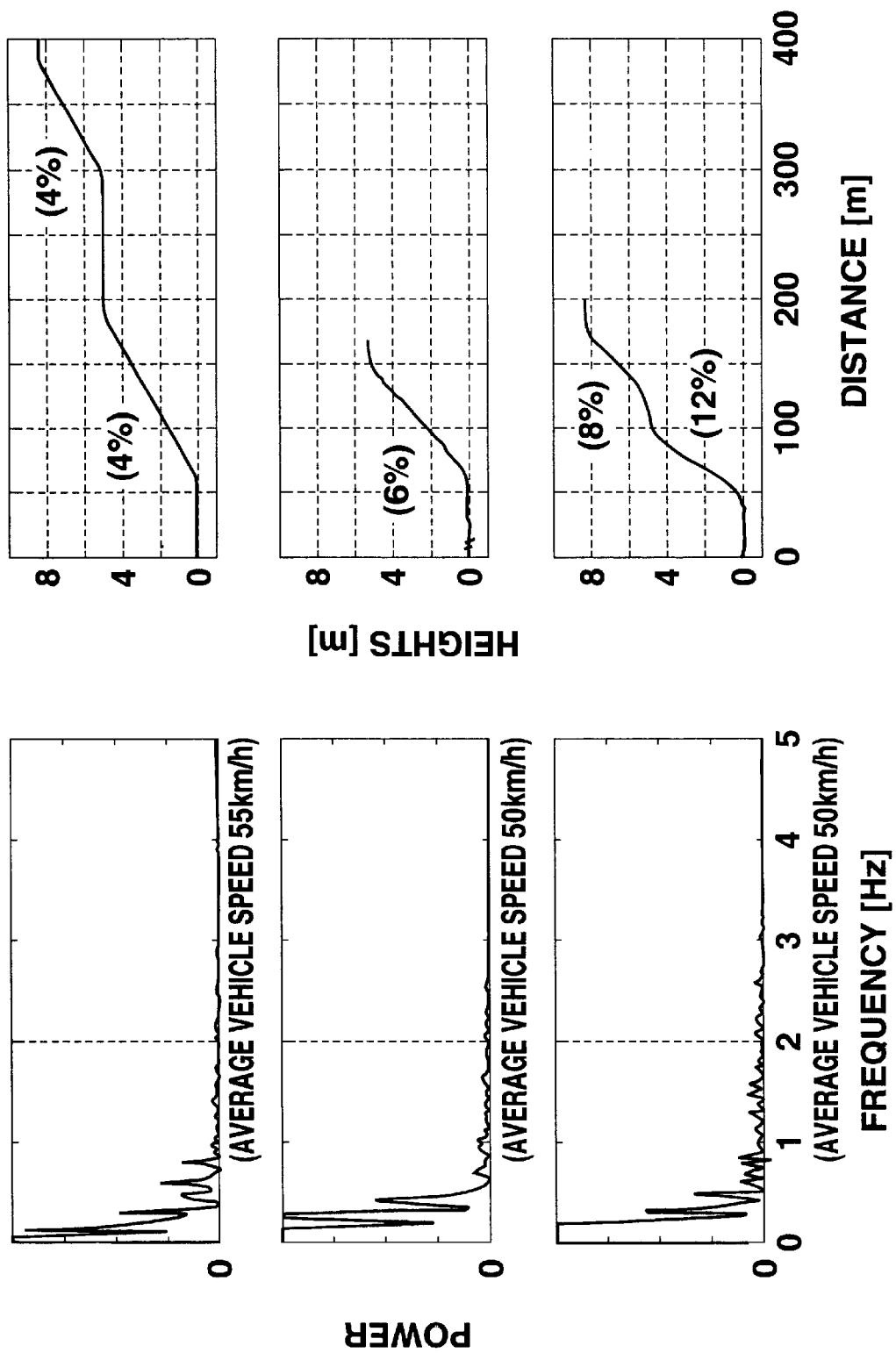
FIG. 4 is graphs showing results of frequency analysis applied to a function $\Theta(t)$ indicative of variation of a gradient, as time passes, when a vehicle runs on roads with gradient as shown.

In the following, preferred embodiments of the present invention will be described. An equation of motion of a vehicle in the longitudinal direction can be expressed as follows:

$$M x \alpha = F - M g \sin \Theta \tag{1}$$

wherein M is vehicle mass, $\alpha$ is acceleration, F is the sum of the forces except force due to a road gradient force acting on a vehicle, $\Theta$ is road gradient, and g is the acceleration of gravity. Force F is a driving force of a power plant, including a motor and a transmission device, deducted by running resistance, and will hereinafter be referred to as gross driving force.

A driving force of a power plant under a certain driving condition can be calculated when the relationship between a driving force of a power plant and an operation requested by a driver (such as an operation of an accelerator pedal and a throttle position), a motor rotation speed, and a total gear ratio of the transmission device, and so on, are obtained in advance.

Running resistance is a sum of friction resistance (such as rolling resistance), which is free from the influence of a vehicle speed, and air resistance, which is substantially proportional to a squared value of a vehicle speed. Running resistance at a certain vehicle speed can be known when running resistance is obtained in advance as characteristic of that vehicle. Therefore, a gross driving force F of a running vehicle at a certain time can be calculated. A vehicle acceleration $\alpha$ can be obtained as a differential value of an output of a speed sensor or an output of an acceleration sensor.

A vehicle mass M is determined, in consideration of a change of the number of passengers and the weight of onboard load, as a value varying from the initial mass m. A vehicle mass M can be expressed as follows:

$$M = \theta m \tag{2}$$

wherein $\theta$ is a vehicle mass variable parameter.

Expression (1) can be rewritten as follows based on Expression (2).

$$\alpha = F/(\theta m) - g \sin \Theta \tag{3}$$

When the vehicle travels on a road with a constant gradient (for a level road, $\Theta=0$), the item in expression (3) relative to gradient resistance term, or ($-g \sin \Theta$), is a constant, and affects only the DC component of an acceleration $\alpha$. Therefore, employment of an acceleration $\alpha$ signal and a gross driving force F both deducted by DC components can provide an equation of motion free from the influence of a constant gradient.

However, a road gradient $\Theta$ may not be constant, and may gradually vary, and the variation is relatively moderate and affects only on a low frequency component of an acceleration $\alpha$. Therefore, when a signal of a low frequency component, as well as a DC component, is removed from signals respectively indicative of an acceleration $\alpha$ and a gross driving force F, an equation of motion free from the influence of a gradient can be obtained even as for the case of a varying gradient. Expression (3) can be rewritten as follows:

$$\underline{\alpha} = \underline{F}/(\theta m) - g \sin \Theta \quad (4)$$

wherein $\underline{\alpha}$ is an acceleration deducted by a signal of a predetermined or lower frequency, and $\underline{F}$ is a gross driving force deducted by a predetermined or lower frequency signal. The term ($-g \sin \Theta$) may be originated from gradient resistance failed to be removed or a measurement error of an acceleration $\alpha$ or a gross driving force F. A method for obtaining a true value from a value containing an error is known, and a vehicle mass variation parameter $\theta$ or a vehicle mass M can be obtained, using such a known method.

Here, it is to be appreciated that a predetermined or lower frequency signal-deducted gross driving force $\underline{F}$ is free from the influence of running resistance. That is, as a frequency of a variation of running resistance (friction resistance and air resistance) is low, as described above, removal of a signal of a predetermined or lower frequency results in removal also of the influence of a variation of running resistance. In other words, with removal of a lower frequency component from a gross driving force F, running resistance needs not be taken into consideration from the beginning. Therefore, it should be noted that a driving force of a power plant can be used intact as a gross driving force to obtain the same result.

Next described is the extent to which gradient affects frequencies. When a gradient is constant, only the DC component of acceleration $\alpha$ is affected, as described above. Therefore, it is sufficient to focus on the frequency proprieties relative to a period with a gradient varying from a certain value to another, because a DC component, and thus the influence of a constant gradient, can be removed as a result of removal of a signal of predetermined or lower frequency. Laws relative to road structures are enacted as a guide in road designs for modification of impacts applied to a part of a road with a varying gradient. Gradient variation defined in such laws may be considered maximum, or a case causing an influence of high frequencies, as the fact that impact modification is unnecessary can assume a small gradient variation. Therefore, when a cut-off frequency is determined such that the influence of such a gradient variation as defined in the law can be removed, any influence due to gradient variation can also be removed.

FIG. 1 shows specification of a part of a road with a varying gradient pursuant to the law. The law defines the length of an arc AB, or an interfering part, of a road having a gradient varying from gradient $\Theta A$ to gradient $\Theta B$, as shown in FIG. 2. The required vertical sectional curve length L in FIG. 1 can be expressed as follows.

$$L = \frac{\overline{AB}}{|\Theta_A - \Theta_B|}$$

Figure 5:
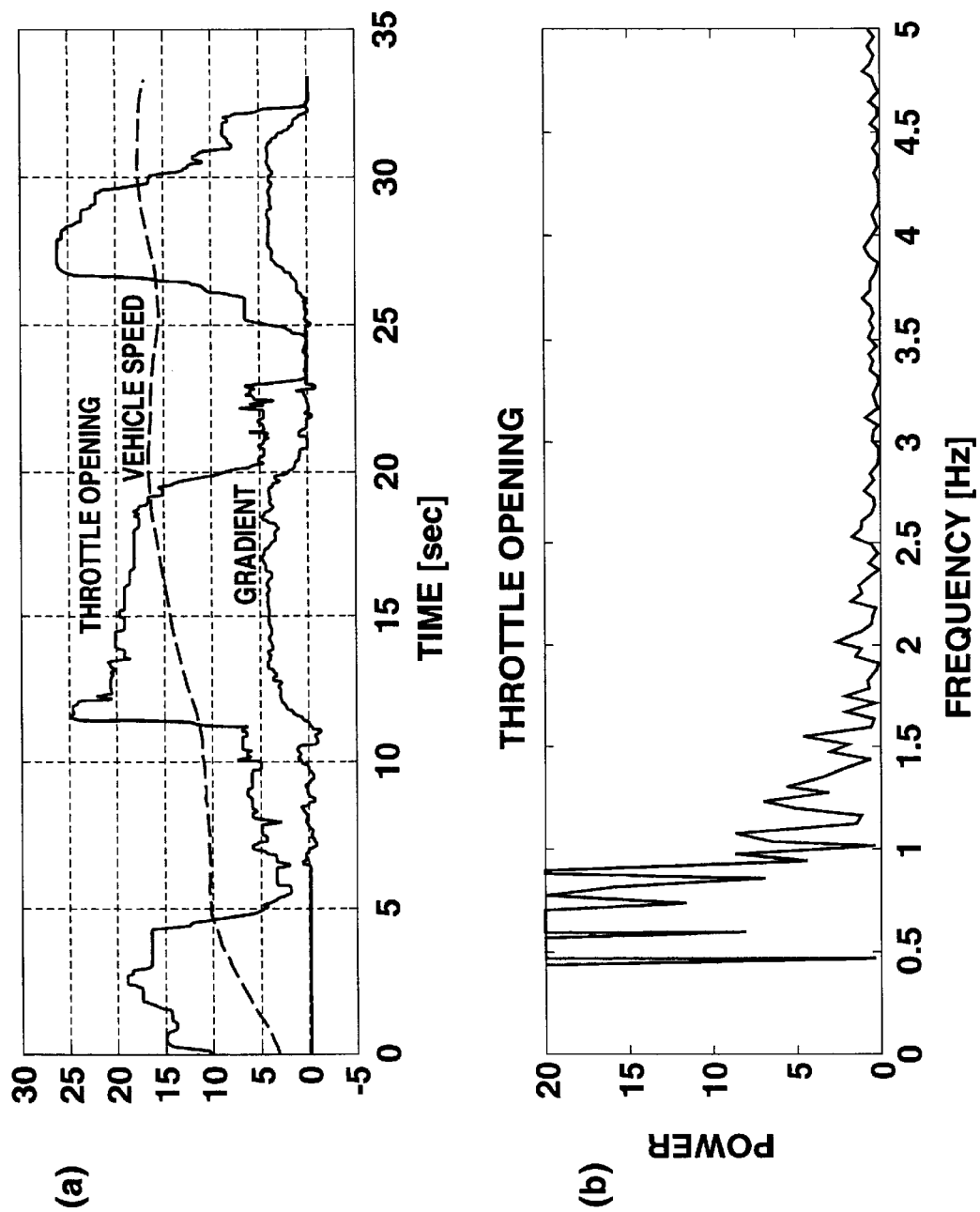
FIG. 5 is graphs showing results of frequency analysis as for variation, as time passes, of a throttle position (a driving force)

When frequency analysis is applied to a function $\Theta(t)$ indicative of a change of a gradient as time passes in the case of a vehicle running at 80 km/h, which is twice the design speed, on a road with a required vertical sectional curve length 4.4 m/%, a frequency distribution indicated by the solid line in FIG. 3 can be obtained. It should be noted that the dotted line in FIG. 3 relative to a frequency distribution obtained when a vehicle runs at a lower speed. As shown, even when a vehicle runs on a road with a varying gradient at a speed twice as high as a design speed, the function $\Theta(t)$ only contains frequency components equal to or less than about 1 Hz. That is, the influence of a gradient can be removed by processing an acceleration signal $\alpha$ and a gross driving force signal F, using a high-pass filter for removing that frequency band. In actuality, frequency analysis proves that a function $\Theta(t)$ indicative of a change in a gradient with a vehicle running on an actual road (roads with gradient as shown in the drawings on the right side) has solely components less than or equal to 1 Hz, as shown in FIG. 4. That is, frequency components related to a change in a gradient are those of merely 2 Hz. Meanwhile, compared to a change of a gradient, a variation in a driving force contains large frequency components of 2 Hz or even higher. FIG. 5 is a diagram showing a result of frequency analysis applied to a variation of a throttle position, which substantially corresponds to a variation in a driving force. Specifically, a throttle position under running condition shown in FIG. 5(a) is given frequency analysis, and the result thereof is shown in FIG. 5(b). Then, with an acceleration $\underline{\alpha}$ and a gross driving force $\underline{F}$ both processed using a high-pass filter having a 2 Hz cut-off frequency, i.e., with high frequency components of an acceleration and a gross driving force, a vehicle mass M(=?m) can be calculated using Expression (4). It should be noted that the value of the cut-off frequency is not limited to 2 Hz, and can be appropriately determined based on results of experimental trials.

Next, an example of a method for calculating a vehicle mass variable parameter $\theta$ will be described. Assuming that the term ($-g \sin \Theta$) in Expression (4) is a residual error e, Expression (4) can be expressed as follows.

$$\underline{\alpha}(k) = \underline{F}(k)/(\theta m) + e(k) \quad (5)$$

wherein k is a sampling time meaning first time or second time and so on.

When a vehicle mass variable parameter $\theta$ is calculated based on Expression (5), a vehicle mass M can be obtained. In the case that the residual error e(k) is neglected, a parameter $\theta$ can be instantly obtained. In a case in which the residual error e(k) is not negligible, at least square method may be sequentially employed for estimating of a parameter $\theta$. When an input u for use in the estimation is $$u = \underline{F}/m \quad (6),$$

an estimating gain kn can be expressed as follows.

$$kn(k+1) = Pn(k)u(k+1)/\{\lambda + u(k+1)Pn(k)u(k+1)\} \quad (7)$$

wherein Pn is an estimated gain parameter. The value of Pn is initially set at a sufficiently large integer, such as 1000, and sequentially updated based on the following.

$$Pn(k+1) = \{1 - kn(k+1)u(k+1)\}Pn(k)/\lambda \quad (8)$$

wherein $\lambda$ is a forgetting factor, and may be, e.g., 0.99. With the above, a vehicle mass variable parameter $\theta$ can be expressed as follows.

$$\theta(k+1) = \theta(k) + kn(k+1)\{y(k+1) - u(k+1)\theta(k)\} \quad (9)$$

Here, as $y(k+1) = \underline{\alpha}(k)$ is held, a vehicle mass M at a sampling time (k+1) can be estimated as $\theta$ (k+1)m.

As described above, a vehicle mass can be calculated based on a gross driving force or a driving force and an acceleration. The power plant for generating a driving force includes a motor for generating a power and a transmission for transmitting a motor output to a driving wheel. When a motor power is transmitted without slipping, a driving force and so on can be calculated based on a power of a motor and gear and total reduction gear ratios of a transmission system. This is applied to a case where a transmission has a manual transmission, or a torque converter of an automatic transmission is controlled in a lock-up state.

On the other hand, when a transmission has a slipping mechanism, such as a torque converter, a launching clutch, and so on, transmission characteristic of the slipping mechanism must be taken into consideration in calculation of a driving force. For example, a torque converter must be taken into consideration as it amplifies an output torque of a motor. Specifically, when a torque ratio is known with respect to a speed ratio between an input and an output of a torque converter, a driving force can be obtained through multiplication of an output motor torque by the torque ratio and further based on the gear and deceleration ratios. Also, the use of a torque capacity can eliminate the need of obtaining output characteristic of a motor.

Figure 6:
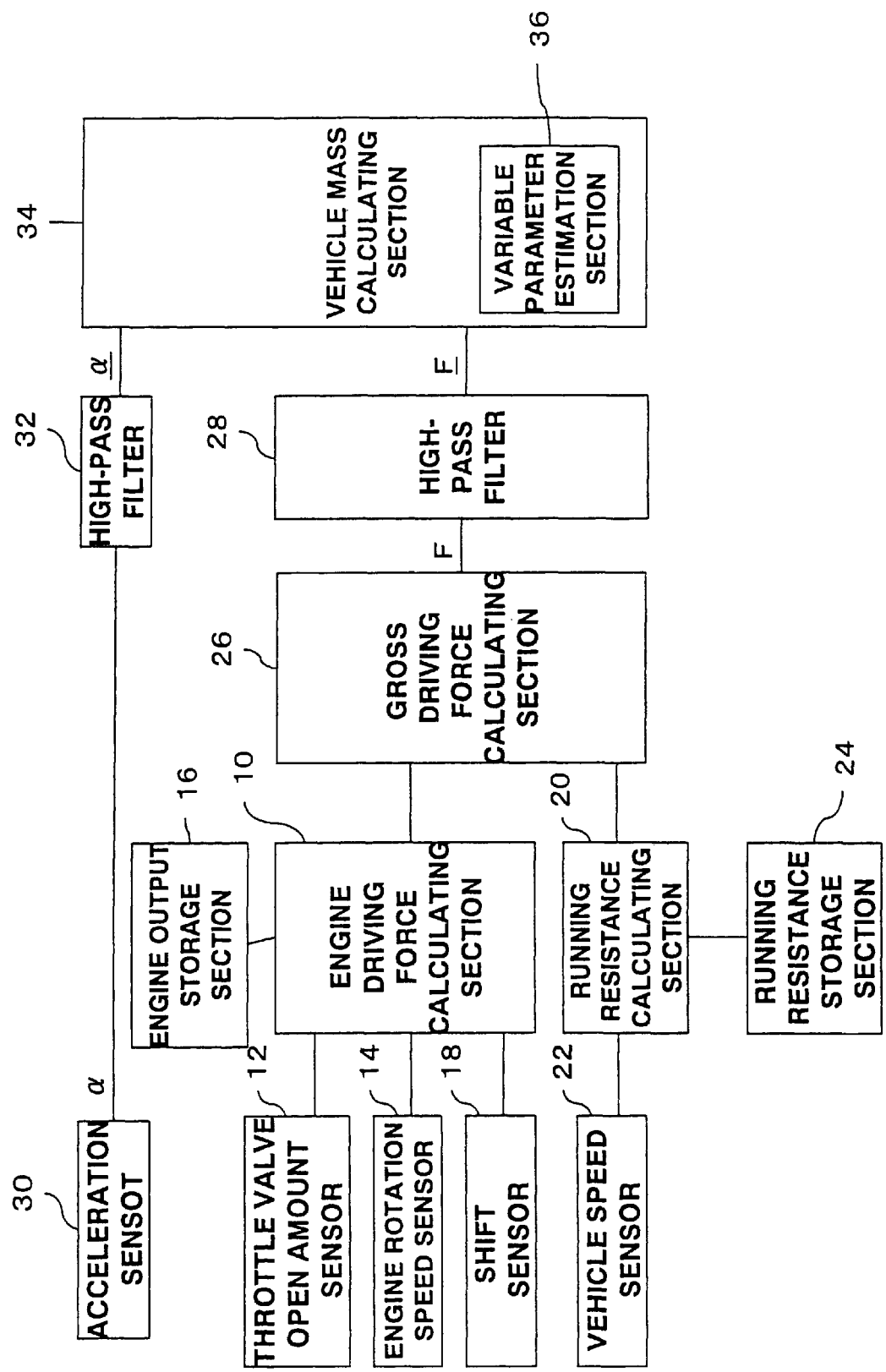
FIG. 6 is a block diagram showing a structure of a vehicle mass calculation apparatus in a preferred embodiment.

FIG. 6 is a block diagram showing a structure of a vehicle mass calculation apparatus in this embodiment. An engine driving force calculating section 10 reads engine power from an engine power storage section 16, which corresponds to the values detected by a throttle position sensor 12 and by an engine rotation speed sensor 14, then obtains a driving wheel output, based on a gear ratio, referring to a value detected by a shift step sensor 18, and finally calculates a vehicle driving force on a driving wheel, generated by an engine based on a tire movement radius and so on. Data on engine power corresponding to throttle value opening and engine rotation speeds is pre-stored in the engine power storage section 16. Preferably, in the engine output storage section 16 is stored data in consideration of dynamic response characteristic as well as normal values.

The engine driving force calculating section 10 need not always have an engine output storage section 16, and may calculate an engine driving force, using any method. Engine rotation inertia may be preferably considered in calculation of an engine driving force.

A running resistance calculating section 20 reads running resistance corresponding to a value detected by the vehicle speed sensor 22, from a running resistance storage section 24. The running resistance storage section 24 may store running resistance in the form of a map with respect to vehicle speeds or in the form of a function indicative of a running resistance curve. A gross driving force calculating section 26 subtracts running resistance from a vehicle driving force generated by the engine, to thereby calculate a total of the forces acting on the vehicle, except a force due to gradient resistance, (a gross driving force). Gross driving force time series signals F are then filtered by a high-pass filter 28, thereby providing processed gross driving signals $\underline{F}$.

Time series signals α indicative of outputs of an acceleration sensor 30 are also filtered by a high-pass filter 32, thereby providing processed acceleration signals α. Acceleration may alternatively be obtained by differentiating an output value of the vehicle speed sensor 22. On the contrary, a vehicle speed may alternatively be obtained by integrating an output value of the acceleration sensor 30.

Based on the processed gross driving signal $\underline{F}$ and the processed acceleration signal $\underline{\alpha}$, a vehicle mass calculating section 34 calculates a vehicle mass. When a vehicle mass calculation is carried out using a successive least square method, as described above, a variable parameter estimation section 36 estimates a variable parameter θ for a vehicle mass, and the vehicle mass calculating section 34 calculates a vehicle mass M based on the estimating variable parameter θ and the initial value m of the vehicle mass.

Figure 7:
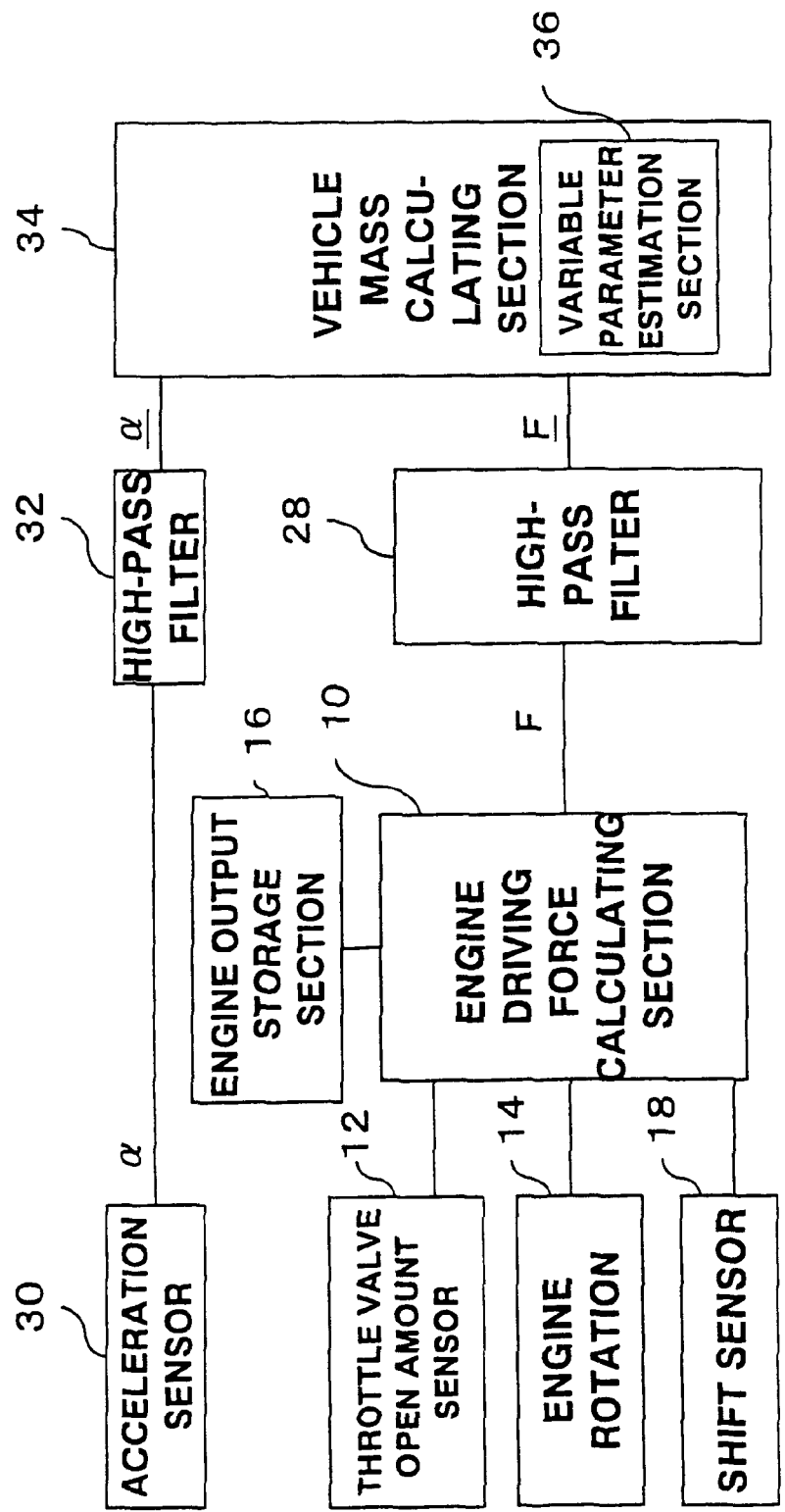
FIG. 7 is a block diagram showing another structure of a vehicle mass calculation apparatus.

FIG. 7 shows another preferred embodiment of the present invention. Removal of a low frequency component from a gross driving signal F results in removal of the influence of running resistance, as well as the influence of a gradient, as described above. Therefore, structures relative to running resistance, namely, the vehicle speed sensor 22, the running resistance calculating section 20, the running resistance storage section 24, and the gross driving force calculating section 26, can be eliminated from the structure of FIG. 6, and the engine driving force calculating section 10 is constructed so as to directly supply an output to the high-pass filter 28. It should be noted that an output signal from the high-pass filter in FIG. 7 is equivalent to a processed gross driving signal $\underline{F}$ shown in FIG. 6, as the filter in FIG. 7 removes the influence of running resistance as well as that of a gradient.

Figure 8:
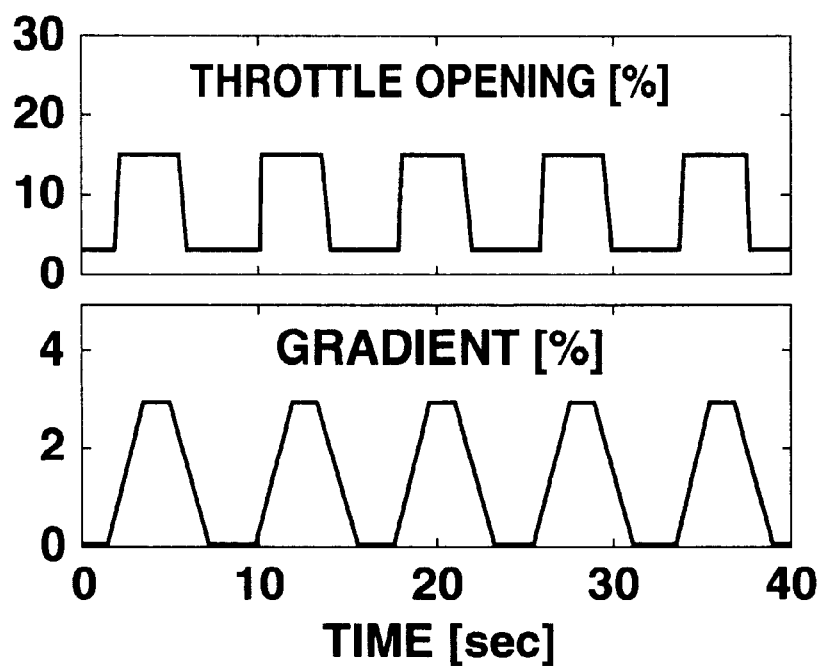
FIG. 8 is a diagram showing simulation conditions.
Figure 9:
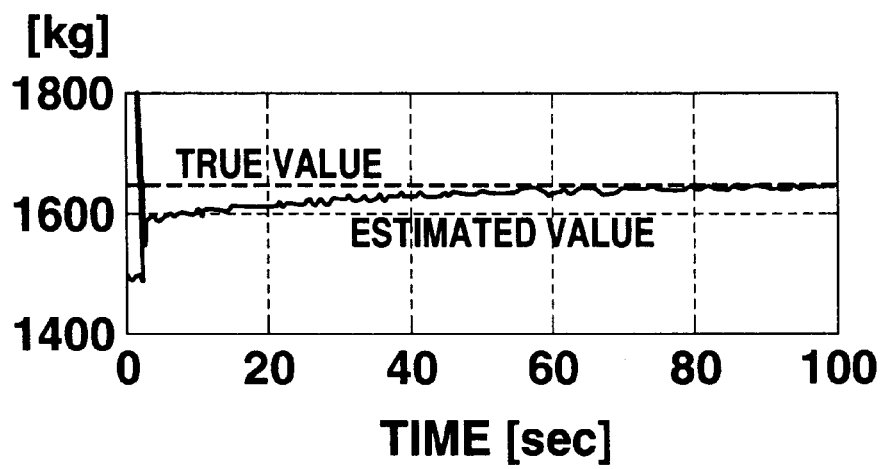
FIG. 9 is a diagram showing a result of simulation under the conditions of FIG. 7 in the preferred embodiment.

FIGS. 8 and 9 show an example of vehicle mass calculation in the preferred embodiments of the present invention. A mass of a vehicle having a throttle opening as shown in FIG. 8 and running on a road with a gradient shown in the same drawing is calculated, and the result is shown in FIG. 9. It can be seen from FIG. 9 that estimation comes to reach values closer to a true value of a vehicle mass, even in the case of a varying gradient.

Here, it should be noted that above description is relative to a case wherein an engine power is transmitted to a driving wheel without slipping. That is, a vehicle mass can be calculated as described above when a transmission device in FIG. 6 or FIG. 7 has a manual transmission, or the torque converter of an automatic transmission is controlled in a lock-up state. Note that a torque converter in a lock-in state is such that a friction clutch incorporated in the torque converter is connected so that input and output sides of the torque converter are connected to each other without intervention of a working liquid. A torque converter in a lock-up state neither amplifies a torque nor changes a rotation speed.

Figure 10:
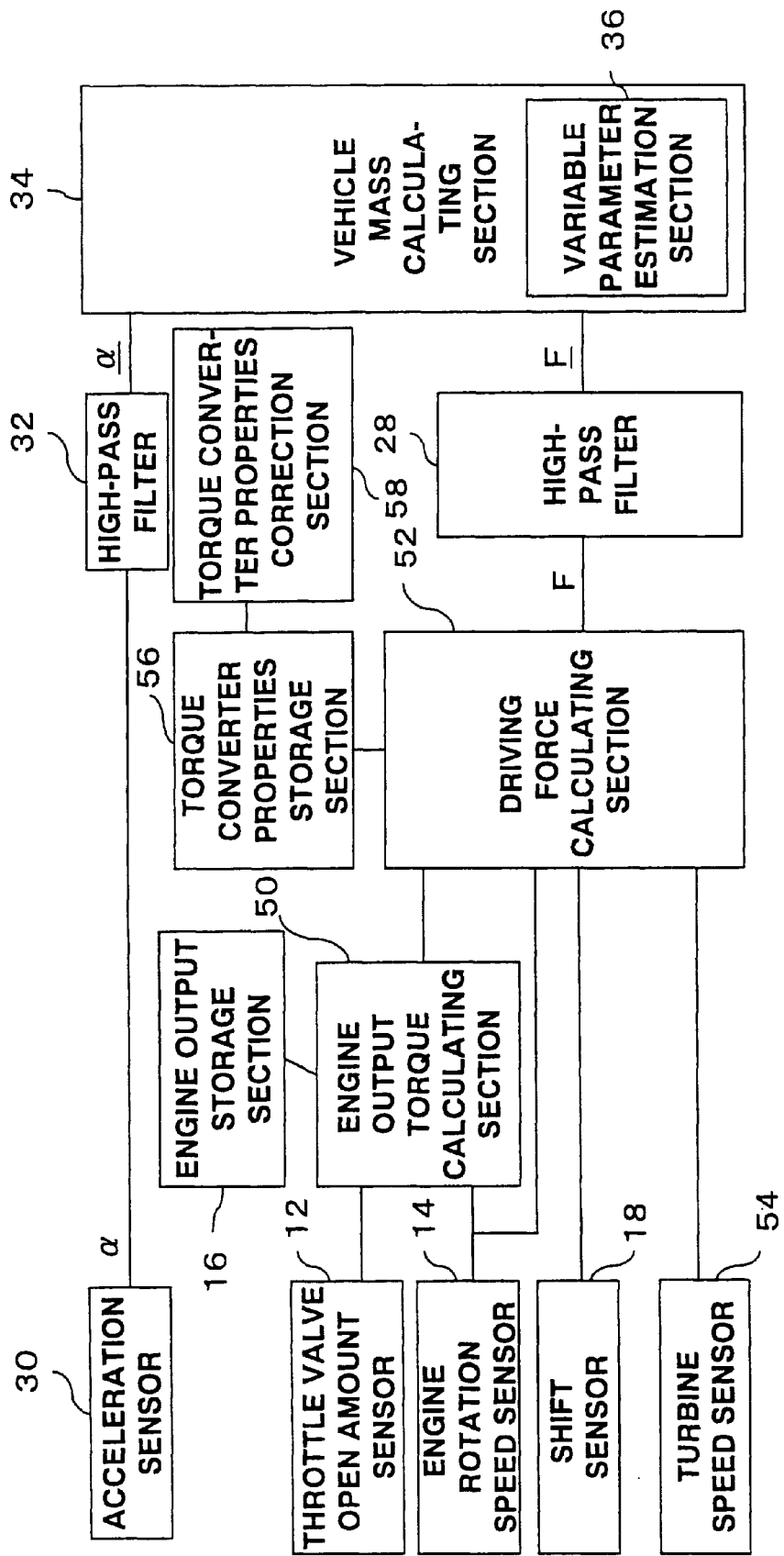
FIG. 10 is a block diagram showing still another structure of a vehicle mass calculation apparatus.

When the torque converter is not in a lock-up state, in other words, when it serves as a liquid transmission mechanism, slipping between an input and an output, i.e., a difference between an input speed and an output speed, may be caused. Under such a condition, torque converter transmission characteristic must be taken into consideration. FIG. 10 shows still another preferred embodiment of the present invention, in the form of a driving force calculation device comprising a power plant having a torque converter. Note that structural members identical to those described with reference to FIG. 6 and so on are given identical reference numerals, and a detailed description thereof is omitted. An engine output torque calculating section 50 determines current driving condition of the engine with reference to outputs of the throttle position sensor 12 and the engine rotation speed sensor 14, and calculates an output torque under that condition with reference to a map stored in the engine power storage section 16.

A driving force calculating section 52 calculates a speed ratio between input and output sides of the torque converter based on outputs of an engine rotation speed sensor 14 and a turbine speed sensor 54, and reads a torque ratio, based on the calculated speed ratio, from the torque converter characteristic storage section 56, which stores a table concerning correspondence between a speed ratio and a torque ratio. A torque on the output side of the torque converter can be calculated by multiplying an engine output torque by the torque ratio. A gear of the transmission, provided downstream of the torque converter, is detected by the gear sensor 18. Then, the driving force calculating section 52 calculates a vehicle driving force. The calculated vehicle driving force is filtered by the high-pass filter 28 whereby gradient and running resistance is removed therefrom.

Mass calculation by the vehicle mass calculating section 34 is carried out in the same operation as described with reference to FIG. 6. That is, the vehicle mass calculating section 34 receives a processed acceleration signal, or an output of the acceleration sensor 30 subjected to high pass filtering, and a processed driving force signal, or an output of the high-pass filter 28, and calculates a vehicle mass based thereon.

Here, characteristic stored in the torque converter characteristic storage section 56 may possibly vary over time. Therefore, a torque converter characteristic correction section 58 is provided in this device to update the characteristic stored in the storage section 56 should they be changed. Details of the torque converter characteristic correction section 58 will be described later.

Figure 11:
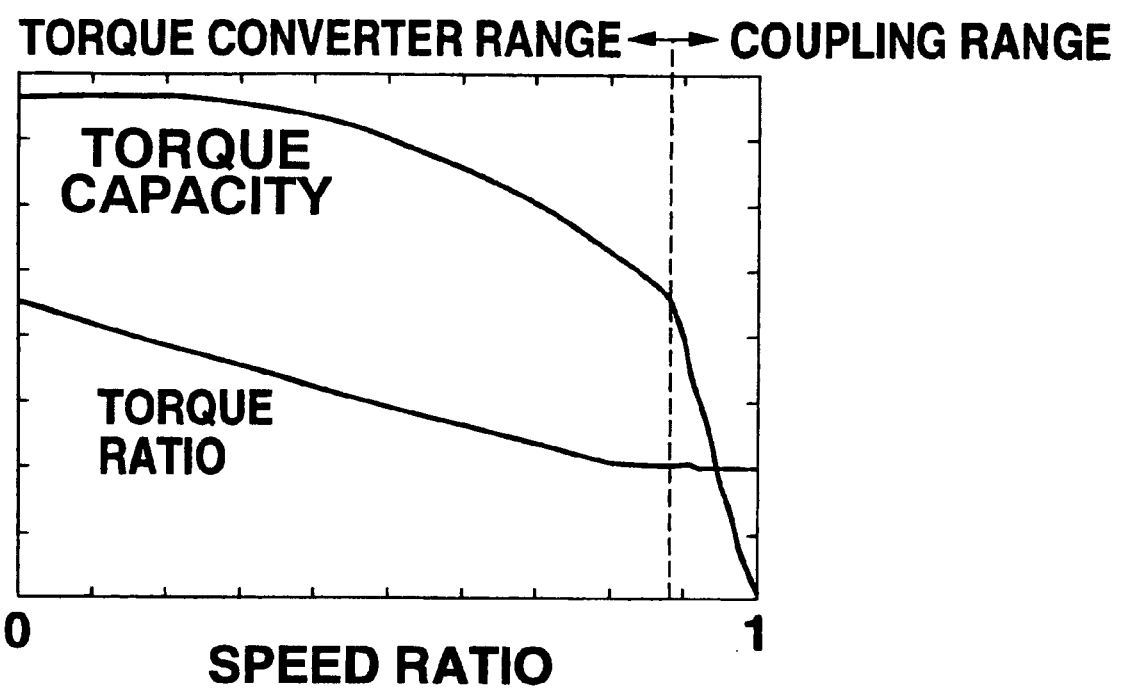
FIG. 11 is a diagram showing an example of transmission characteristic of a torque converter.
Figure 12:
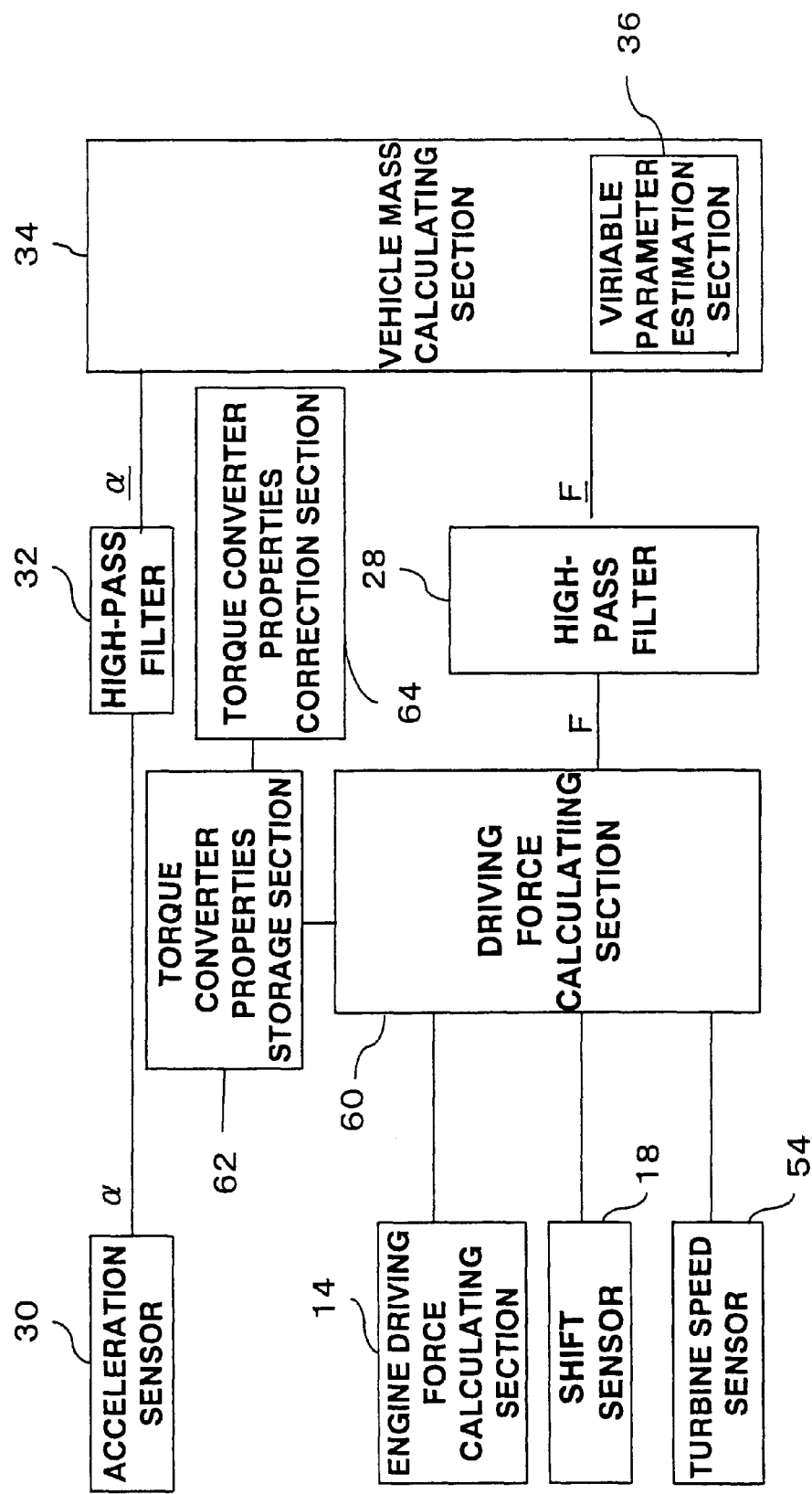
FIG. 12 is a block diagram showing yet another structure of a vehicle mass calculation apparatus.

FIG. 12 shows yet another preferred embodiment of the present invention. A pump torque Tp of a torque converter retains the following relationship with a pump rotation speed, i.e., an engine rotation speed Ne.

$$Tp = C(e) \cdot Ne^2 \tag{10}$$

wherein C(e) is a torque capacity, which is known to have a constant relationship with a torque ratio, as shown in FIG. 11. Therefore, the driving force calculating section 60 can calculate a pump torque Tp of a torque converter based on outputs of the engine rotation speed sensor 14 and the turbine speed sensor 54 and a torque capacity C(e), stored in the torque converter characteristic storage section 62. By multiplying the calculated pump torque Tp by a torque ratio, a turbine torque can be obtained. Further, the driving force calculating section 60 calculates a vehicle driving force based on a gear ratio and so on of the gear, detected by the gear sensor 18. The calculated vehicle driving force is then filtered by the high-pass filter 28 whereby gradient and running resistance are removed therefrom.

Mass calculation by the vehicle mass calculating section 34 is carried out in the same operation as described with reference to FIG. 6. That is, the vehicle mass calculating section 34 receives a processed acceleration signal, or an output of the acceleration sensor 30 subjected to high pass filtering, and a processed driving signal, or an output of the high-pass filter 28, and calculates a vehicle mass based thereon.

Here, characteristic stored in the torque converter characteristic storage section 62 may possibly vary as time passes. Thus, a torque converter characteristic correction section 64 is provided in this device to update the characteristic stored in the storage section 62 should they be changed.

It should be noted that a gradient of a torque capacity relative to a speed ratio is sharp in an area with a high speed ratio, or a coupling area, as shown in FIG. 11. Therefore, an error in calculating a driving force based on a torque capacity may possibly increase. Therefore, a driving force of a motor may be used in a coupling area, and a driving force may be calculated based on a torque capacity of a torque converter in other areas.

In the following, torque converter characteristic correction sections 58, 64 will be described.

Figure 13:
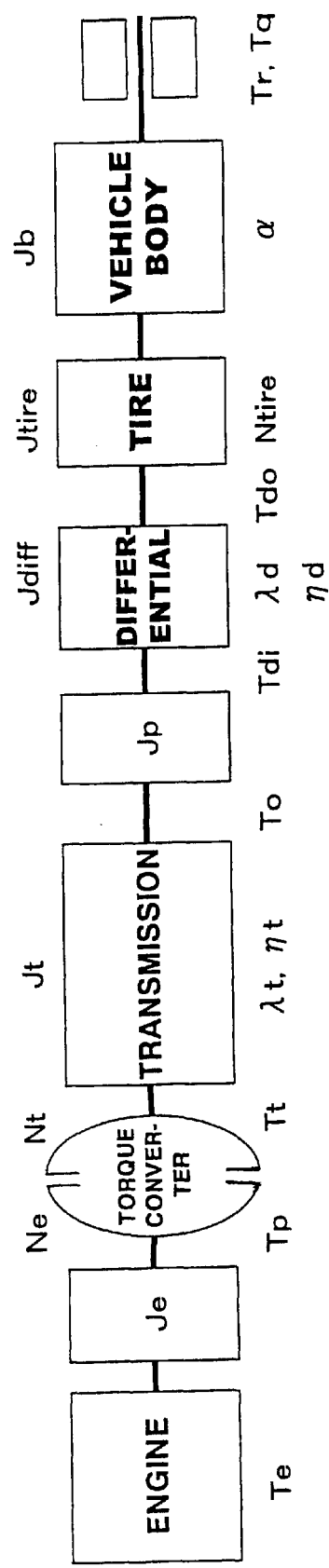
FIG. 13 is a schematic diagram showing an example of a vehicle power train having a torque converter.
Figure 14:
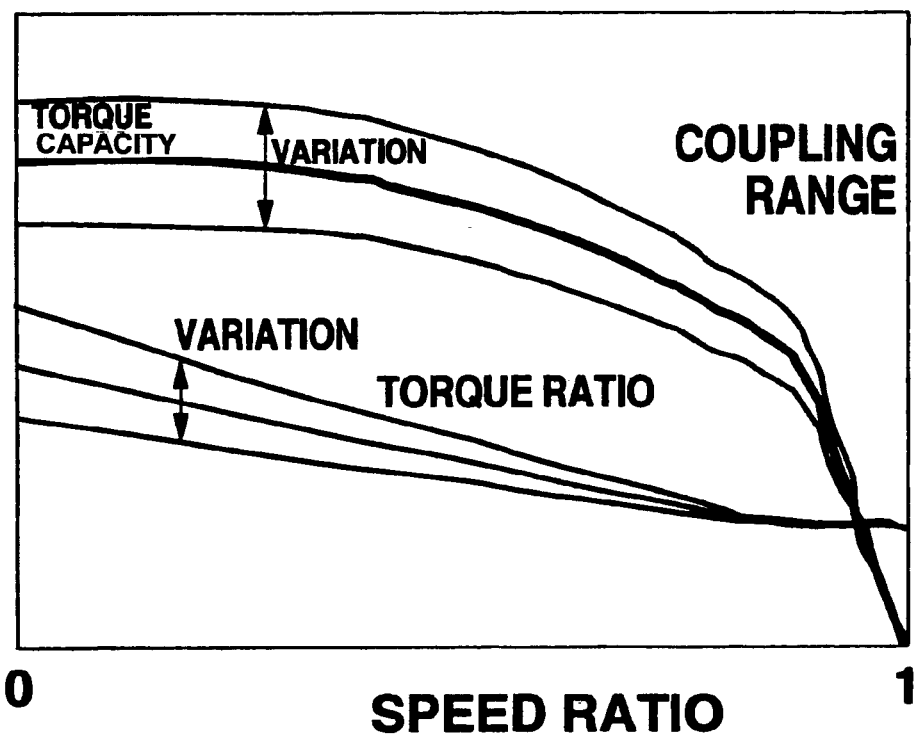
FIG. 14 is a diagram showing variation of transmission characteristic of a torque converter.

FIG. 13 shows an example of a power train system comprising an engine and a torque converter. Assuming, for brevity, that the respective sections of the system are made of a rigid material, an equation of motion relative to the system can be expressed as follows, which, however, is not applicable to a vehicle with a gear shifting. Alternatively, spring or damper properties may be considered in an equation of motion.

$$2\pi Je\dot{N}e = Te - Tp$$

$$Tp = Tt/t,$$
$$t = Tt/Tp$$

$$2\pi Jt\dot{N}t = \eta tTt - To$$

$$2\pi Jp\dot{N}t/\lambda t = To - Tdi$$

$$2\pi Jdiff\dot{N}t/\lambda t = \eta dTdi - Tdo$$

$$2\pi(Jtire + Jb)\dot{N}t/(\lambda + \lambda d) = Tdo - (Tr + Tg) \tag{11}$$

Jt: automatic transmission inertia (including torque converter turbine inertia, depending on automatic transmission gear ratio)

Jp: propeller shaft inertia

Jdiff: differential inertia (including drive shaft inertia)

Jtire: tire inertia

Jb: vehicle equivalent inertia

Te: engine torque

Tp: pump torque

Tt: turbine torque

To: automatic transmission output torque

Tdi: differential input torque

Tdo: differential output torque

Tr: running resistance (rolling resistance, air resistance)

Tg: gradient resistance t: torque ratio of torque converter

Ne: engine rotation speed

Nt: turbine rotation speed $\lambda$t: automatic transmission gear ratio $\lambda$d: differential gear ratio $\eta$t: automatic transmission efficiency (depending on $\lambda$ t)

$\eta$t: differential efficiency

Expression (11) may be rewritten as follows when it is solved with respect to a pump torque Tp.

$$Tp = Tt/t$$

$$= 2\pi[Jt/(\eta t) + Jp/(\eta t\lambda t) + Jdiff/(\eta t\eta d\lambda t) + (Jtire + Jb)/(\eta t\eta d\lambda t\lambda d)]\dot{N}t + (Tr + Tg)/(\eta t\eta d) \tag{12}$$

Ne, Nt are expressed as Ne(.), Nt(.) in this specification. That is, Ne(.), Nt(.), Tr, Tg are calculated for estimation of a pump torque. Ne(.) and Nt(.) are obtained by differing Ne and Nt, both being obtained by a rotation speed sensor. Tr, which can be approximated as a factor of a vehicle speed, can be calculated from Nt. Tg is calculated from gradient information, obtained from a gradient sensor, a navigation system, and so on.

Alternatively, a pump torque can be estimated as follows, using a tire rotation frequency Ntire and a vehicle longitudinal acceleration $\alpha$, if these are detectable. A vehicle longitudinal acceleration may be either detected using an acceleration sensor or calculated based on a tire rotation frequency.

$$Tp = 2\pi[Jt/(\eta t) + Jp/(\eta t\lambda t) + Jdiff/(\eta t\eta d\lambda t)]\dot{N}t + 2\pi(Jtire + Jb)/(\eta t\eta d)\dot{N}tire + (Tr + Tg)/(\eta t\eta d) \tag{13}$$

$$Tp = 2\pi[Jt/(\eta t) + Jp/(\eta t\lambda t) + Jdiff/(\eta t\eta d\lambda t)]\dot{N}t + (Jtire + Jb)/(\eta t\eta d \, rtire)\alpha + (Tr + Tg)/(\eta t\eta d) \tag{14}$$

wherein rtire is an effective tire radius.

Further alternatively, when the torque converter is not in a locked-up state (a speed ratio : e=Nt/Ne≠1), a pump torque can be calculated using Expression (10), based on a torque capacity C(e) of the torque converter and an engine rotation frequency Ne.

$$Tp = C(e) \cdot Ne^2 \tag{10}$$

Therefore, a torque capacity C(e) can be obtained using Expressions (10) and (12), and alternatively estimated using Expression (15). The same result may be obtained using Expressions (13) and (14) in place of Expression (12).

$$C(e)=[2\pi\{Jt/(\eta_t t)+Jp/(\eta_t\lambda t)+Jdiff/(\eta_t\eta_d\lambda t)+(Jtire+Jb)/(\eta_t\eta_d\lambda t\lambda d)]\}\dot{N}t+(Tr+Tg)/(\eta_t\eta_d)]/Ne^2 \tag{15}$$

A torque ratio t(e) can be obtained using Expressions (10) and (12), and alternatively estimated using Expression (16). The same result may be obtained using Expressions (12) and (13) in place of Expression (11).

$$t(e)=[2\pi\{Jt/(\eta t)+Jp/(\eta t\lambda t)+Jdiff/(\eta t\eta_d\lambda t)+(Jtire+Jb)/(\eta t\eta_d\lambda t\lambda d)]\}\dot{N}t+(Tr+Tg)/(\eta t\eta_d)]/(C(e)Ne^2) \tag{16}$$

Because the torque capacity C(e) and the torque ratio t(e) are calculated both using Expressions (10) and (12), the value first updated may be subjected to stronger correction. Therefore, preferably, the order of calculation may be changed alternately, so that estimations of the torque capacity C(e) and the torque ratio t(e) are more likely to result in values closer to actual values.

In order to ultimately calculate a turbine torque Tt using Expressions (10) and (12), once relationships between a speed ratio and a torque capacity C(e), and between a speed ratio and a torque ratio t(e) are known, a turbine torque Tt can be estimated as fluctuation of a torque capacity C(e) and a torque ratio t(e).

Here, a torque capacity C(e) and a torque ratio t(e) obtained using Expressions (15) and (16) are relative. to a certain speed ratio. When respective relationship (curvatures) relative to speed ratios, of torque capacities C(e) and of torque ratios t(e) after variation can be determined uniquely with respect to any desired speed ratio, a torque capacity C(e) and a torque ratio t(e) may be obtained using Expressions (15) and (16) with respect to a driving condition resulting in a smallest estimation error, or torque capacity proprieties and torque ratio proprieties can be estimated based on an average obtained from a few times of execution of Expressions (15) and (16), in order to prevent erroneous updating due to an emergent noise or disturbance contained in the detected information when substituting previously estimated torque capacity characteristic and torque ratio characteristic with the last estimated torque capacity characteristic and torque ratio characteristic, respectively, afilter, e.g., Expression (17), may be used to obtain the latest torque capacity and torque ratio for use in the update, and corresponding torque capacity characteristic and torque ration characteristic are selected.

$$C(e)new=(1-\beta)C(e)old-\beta C(e)new(0<\beta<1)$$

$$t(e)new=(1-\beta)t(e)old-\beta t(e)new(0<\beta<1) \tag{17}$$

wherein C(e)new, t(e)new are the last estimated torque capacity and the last estimated torque ratio, respectively, C(e)old, t(e)old are a previously estimated torque capacity and a previously estimated torque ratio, respectively, and β is a filter factor, which preferably may be determined according to an estimation error or the like.

Preferably, erroneous estimation prevention device may be provided for prohibiting estimation should an abnormal change in a rotation frequency, such as due to a slipping tire or the like, be detected.

With the above structure, a torque of a power train system (such as a turbine torque, a transmission output axial torque) can be highly accurately estimated without being affected by variation in transmission torque proprieties of a torque converter (such as a torque capacity, a torque ratio, and so on). As a result, accuracy in estimation of a vehicle mass can be improved.

Figure 15:
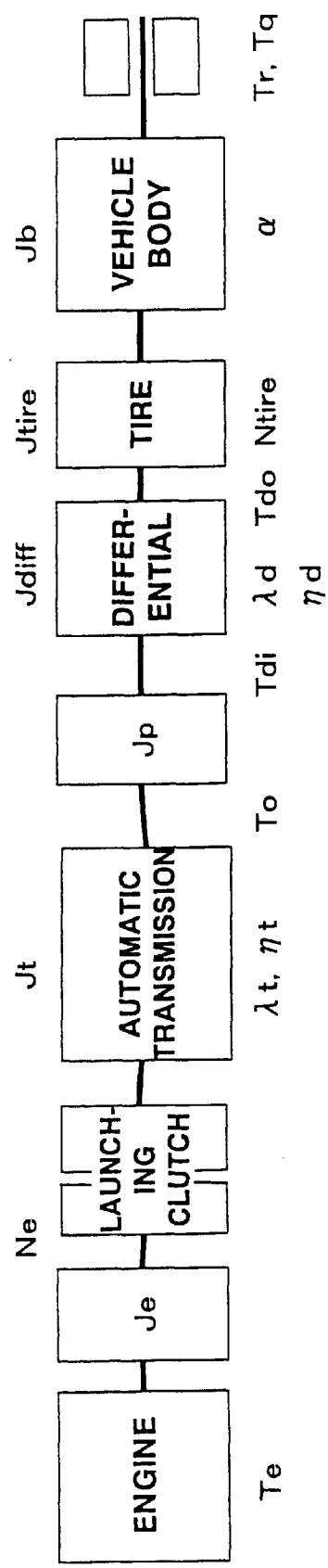
FIG. 15 is a schematic diagram showing an example of a vehicle power train having a launching clutch.

FIG. 15 shows an example of a drive train using a launching clutch. A launching clutch is a device for gradually connecting a clutch according to a driver's operation with an acceleration pedal and so on at the time of staring the vehicle, and carries out a clutch operation on behalf of the driver. A driving force can be calculated in consideration of slipping proprieties of a launching clutch when a transmission torque ratio relative to a speed ratio between an input and an output is obtained in advance, similar to a case wherein a torque converter is employed.

Figure 16:
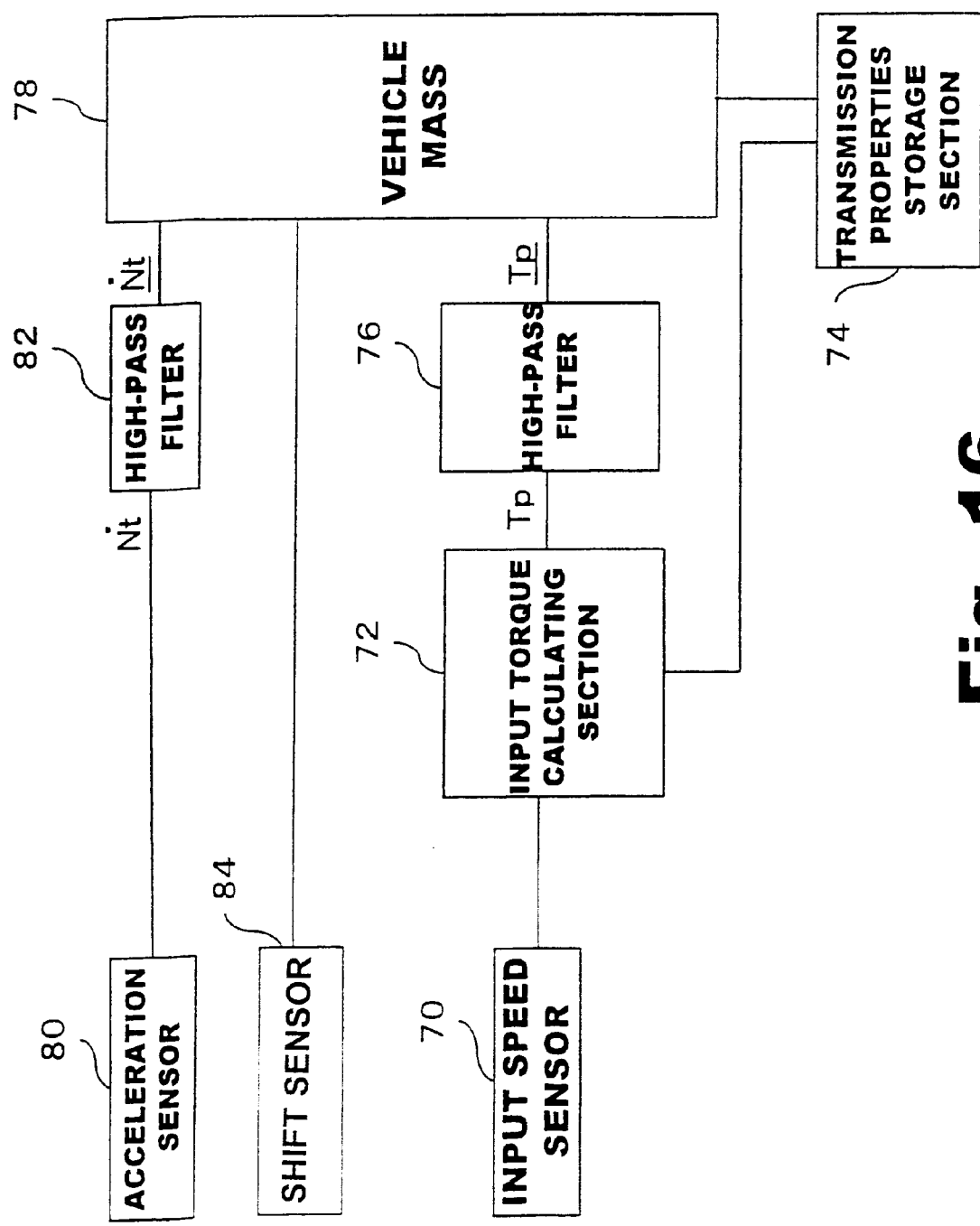
FIG. 16 is a block diagram showing yet another structure of a vehicle mass calculation apparatus.

FIG. 16 shows yet another preferred embodiment of the present invention. Expression (12) can be taken as an expression of motion relative to a torque converter turbine, in which inertia of a transmission mechanism or that of a vehicle is imparted to the torque converter turbine as equivalent inertia. Therefore, by solving the expression of motion, inertia on the turbine side and, eventually, a vehicle mass can be obtained.

An input to a turbine can be calculated by multiplying a pump torque Tp by a torque ratio t. A pump torque Tp can be calculated using Expression (10), and a turbine rotation acceleration Nt(.) can be obtained by differentiating an output of the turbine rotation speed sensor. Equivalent inertia, transmission efficiency, and so on, are assumed to be substantially constant in the respective sections. Terms relative to running resistance Tr and gradient resistance Tg, which are DC or low frequency components, as described above, can be removed through high pass filtering. Therefore, equivalent inertia Jb of a vehicle can be obtained by solving Expression (12). A vehicle mass can be calculated based on the obtained equivalent inertia Jb.

This will be specifically described with reference to FIG. 16. An input speed sensor 70 detects either one of an engine rotation speed and a torque converter pump rotation speed, which generally coincide to each other. The input torque calculating section 72 applies the detected speed and a torque capacity C(e) of the torque converter, stored in the transmission proprieties storage section 74, to Expression (10) to calculate a pump torque signal indicative of a pump torque Tp, the signal also being referred to as Tp in the following. A low frequency component of a pump torque signal Tp is removed using a high-pass filter 76, whereby the influence of running and gradient resistance can be removed therefrom. A resultant processed pump torque signal Tp, subjected to high pass filtering, is input to the vehicle mass calculating section 78.

Meanwhile, an acceleration sensor 80 detects and differentiates a turbine rotation speed. The accelerator sensor 80 supplies an output signal Nt(.) to ahigh-pass filter 82 to remove a low frequency component therefrom, and a resultant processed acceleration signal Nt is output. Note that the reason for application of high pass filtering to an acceleration signal Nt(.) is the same as that for a high-pass filter 32 being used for the device shown in FIG. 6. The resultant processed acceleration signal Nt(.) is input to the vehicle mass calculating section 78.

Further, the vehicle mass calculating section 78 also receives information on a currently selected shift step, detected by the shift step sensor 84, and, based thereon, reads inertia, efficiency, and so on, of the respective sections from the transmission system proprieties storage section 74.

Based on the supplied processed acceleration signal Nt(.), processed pump torque signal Tp, and transmission system proprieties, the vehicle mass calculating section 78 solves Expression (12) in view of equivalent inertia Jb of a vehicle, and further calculates a vehicle mass.

Alternatively, Expressions (13) and (14) can be used as an equation of motion. In this case, wheel acceleration and vehicle acceleration are used in addition to turbine acceleration, though the number of sensors need not be increased as a turbine acceleration, a wheel acceleration, and a vehicle acceleration hold predetermined mutual relationship.

It should be noted that the respective calculating sections shown in FIGS. 6, 7, 10, 12, 16 may actually be CPUs which operate according to a program, and that the respective storage sections may be known memory means, such as a ROM. It should also be noted that the motor, which is an engine in the embodiment shown in FIG. 6, may take any form, such as an electric motor or combination of an engine and an electric motor.

What is claimed is:

1. A vehicle mass calculation apparatus, comprising:
   acceleration calculating device for calculating a longitudinal acceleration of a vehicle to obtain an acceleration signal;
   driving force calculating device for obtaining a driving force signal corresponding to a driving force of a power plant of the vehicle;
   first signal processing device for removing influence of resistance acting on the vehicle from the acceleration signal to obtain a processed acceleration signal;
   second signal processing device for removing influence of resistance acting on the vehicle from the driving force signal to obtain a processed driving force signal; and
   vehicle mass calculating device for calculating a vehicle mass based on the processed acceleration signal and the processed driving force signal.

2. A vehicle mass calculation apparatus according to claim 1, wherein the power plant has a transmission device including a slip transmitting element causing a slip, and a motor, and wherein the driving force calculating device obtains a driving force signal based on transmission torque characteristic of the slip transmitting element with respect to a speed ratio between an input and an output of the slip transmitting element.

3. A vehicle mass calculation apparatus according to claim 2, wherein the slip transmitting element is a torque converter, the transmission torque characteristic is a torque ratio between an input and an output, and the driving force calculating device calculates a driving force of the power plant based on a torque generated by the motor and the torque ratio.

4. A vehicle mass calculation apparatus according to claim 2, wherein the slip transmitting element is a torque converter, the transmission torque characteristic is a torque capacity, and the driving force calculating device calculates a driving force of the power plant based on a pump rotation speed of the torque converter and the torque capacity.

5. A vehicle mass calculation apparatus according to claim 2, wherein the slip transmitting element is a launching clutch, the transmission torque characteristic is a torque ratio between an input and an output, and the driving force calculating device calculates a driving force of the power plant based on a torque generated by the motor and the torque ratio.

6. A vehicle mass calculation apparatus according to claim 2, further, comprising transmission torque characteristic calculating device for calculating the transmission torque characteristic based on a predetermined physical relationship between an input and an output of the transmission device.

7. A vehicle mass calculation apparatus according to claim 1, wherein the first signal processing device is a first high-pass filter for removing a frequency band less than or equal to a predetermined frequency; and the second signal processing device is a second high-pass filter for removing a frequency band less than or equal to the predetermined frequency.

8. A vehicle mass calculation apparatus, comprising:
   acceleration calculating device for calculating longitudinal acceleration of a vehicle to obtain an acceleration signal;
   driving force calculating device for obtaining a gross driving force signal corresponding to a gross driving force resulting from a driving force of a power plant of the vehicle deducted by running resistance;
   first signal processing device for removing influence of road gradient from the acceleration signal to obtain a processed acceleration signal;
   second signal processing device for removing influence of road gradient from the driving force signal to obtain a processed driving force signal;
   vehicle mass calculating device for calculating a vehicle mass based on the processed acceleration signal and the processed driving force signal.

9. A vehicle mass calculation apparatus for calculating a mass of a vehicle loaded with a power plant including a motor and a transmission device, comprising:
   device for calculating a first physical variable relative to an acceleration calculated by the output rotational speed of the transmission device to obtain a first signal;
   device for calculating a second physical amount relative to an input torque of the transmission device to obtain a second signal;
   device for storing transmission characteristic of the transmission device;
   first signal processing device to remove influence of resistance acting on the vehicle from the first signal to obtain a first processed signal;
   second signal processing device to remove influence of resistance acting on the vehicle from the second signal to obtain a second processed signal; and
   vehicle mass calculating device for calculating a mass of the vehicle based on the first processed signal and the second processed signal.

10. A vehicle mass calculation apparatus according to claim 9, wherein the transmission device includes a torque converter, the first physical amount is a turbine rotation acceleration of the torque converter, the second physical variable is a pump rotation acceleration of the torque converter, and the transmission characteristic is a torque capacity and a torque ratio of the torque converter.

11. A vehicle mass calculation apparatus according to claim 9, herein the transmission device includes a torque converter, the first physical variable is a turbine rotation acceleration of the torque converter and a wheel rotation acceleration, the second physical variable is a pump rotation acceleration of the torque converter, and the transmission characteristic is a torque capacity and a torque ratio of the torque converter.

12. A vehicle mass calculation apparatus according to claim 9, wherein the transmission device includes a torque converter, the first physical variable is a turbine rotation acceleration of the torque converter and a longitudinal acceleration of the vehicle, the second physical variable is a pump rotation speed of the torque converter, and the transmission characteristic are a torque capacity and a torque ratio of the torque converter.

13. A vehicle mass calculation apparatus according to claim 9, wherein the resistance acting on the vehicle includes running resistance and gradient resistance, the running resistance including rolling resistance and air resistance.

14. A vehicle mass calculation apparatus according to claim 9, wherein the first signal processing device is a first high-pass filter for removing a frequency band less than or equal to a predetermined frequency, and the second signal processing device is a second high-pass filter for removing a frequency band less than or equal to the predetermined frequency..

15. A vehicle mass calculation apparatus, comprising:

acceleration calculating device for calculating a longitudinal acceleration of a vehicle to obtain an acceleration signal;

driving force calculating device for obtaining a driving force signal based on a driving force of a motor;

first signal processing device for removing influence of road gradient from the acceleration signal to obtain a processed acceleration signal;

second signal processing device for removing influence of road gradient from the driving force signal to obtain a processed driving force signal;

vehicle mass calculating device for calculating a vehicle mass based on the processed acceleration signal and the processed driving force signal.

16. A vehicle mass calculation apparatus according to claim 15, wherein the first signal processing device is a first high-pass filter for removing a frequency band less than or equal to a predetermined frequency and the second signal processing device is a second high-pass filter for removing a frequency band less than or equal to the predetermined frequency.

* * * * *